United States Patent [19]

Dale

[11] 4,343,640
[45] Aug. 10, 1982

[54] ATTENUATION BURNER FOR FORMING FIBERS

[75] Inventor: Thomas L. Dale, Englewood, Colo.

[73] Assignee: Manville Service Corporation, Denver, Colo.

[21] Appl. No.: 245,861

[22] Filed: Mar. 20, 1981

[51] Int. Cl.³ ............................................. C03B 37/06
[52] U.S. Cl. ..................................... 65/16; 65/374.11; 431/350
[58] Field of Search .......................... 65/5, 16, 374.11; 431/350

[56] References Cited

U.S. PATENT DOCUMENTS

| 2,554,486 | 5/1951 | Austin ................................. 65/16 X |
| 2,978,744 | 4/1961 | Schroeder ......................... 65/16 X |
| 3,002,224 | 10/1961 | Stalego et al. ..................... 65/16 X |
| 3,547,568 | 12/1970 | Shisler ............................... 65/16 X |

Primary Examiner—Robert L. Lindsay, Jr.
Attorney, Agent, or Firm—Joseph J. Kelly; Robert M. Krone; Richard K. Thomson

[57] ABSTRACT

This invention relates to a burner apparatus (10) suitable for use in the flame attenuation of glass filaments. The flame attenuation burners of the prior art are subject to deleterious deposits of glass that have not been properly attenuated by the burner apparatus. These deposits usually form adjacent to the outlet opening (20) in the refractory material constituting the combustion chamber of the burner apparatus (10). In use, these deposits are removed by a mechanical process which tends to cause damage to the refractory material (12) of the burner apparatus (10). The present invention incorporates a metallic protector or a plate (22) having a discharge passageway (26) having an area slightly greater than the area of the outlet opening (20) and provides a means to protect the burner refractory material (12) from damage during mechanical removal of any glass deposits.

5 Claims, 3 Drawing Figures

U.S. Patent   Aug. 10, 1982   4,343,640
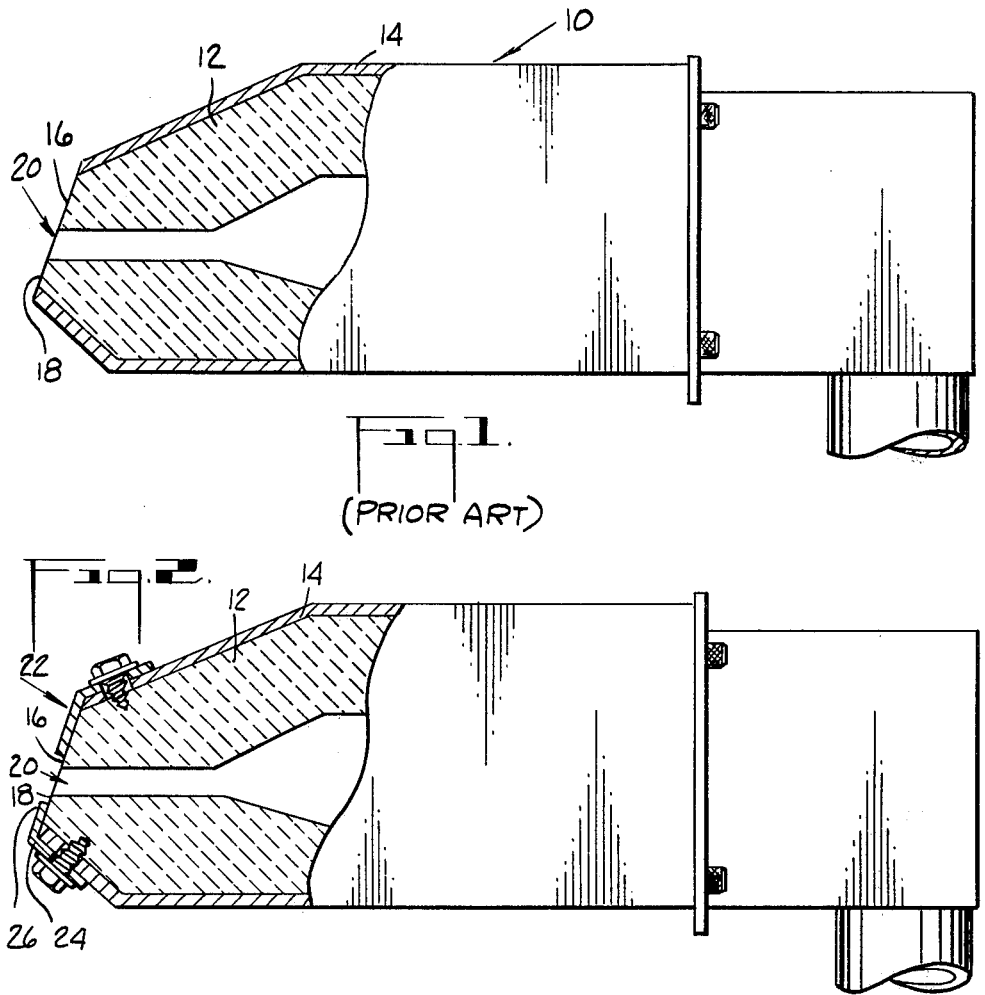
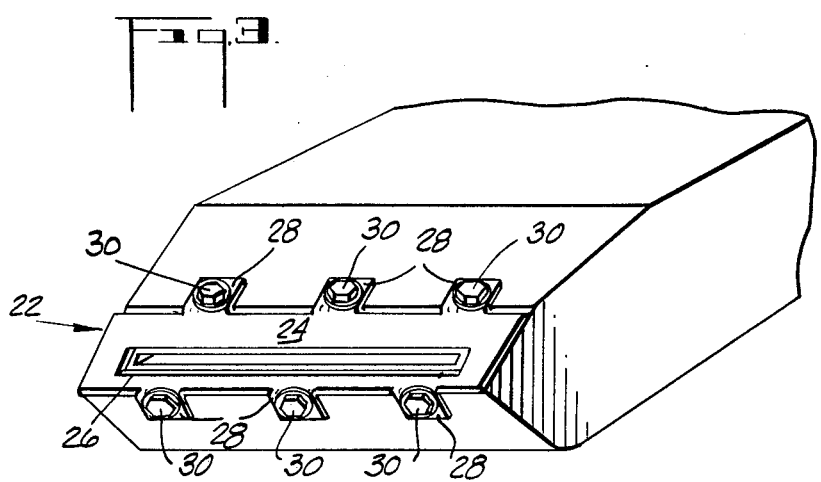

ATTENUATION BURNER FOR FORMING FIBERS

TECHNICAL FIELD

This invention relates to the processing of synthetic filaments and more particularly to an improved burner apparatus for attenuating glass filaments into fibers.

BACKGROUND OF PRIOR ART

It is common practice in the fiber glass industry to simultaneously produce a multiplicity of continuous primary glass filaments from a single melting pot and then subject the primary filaments to a continuous hot gaseous blast to reduce the primary filaments to fine fibers for use as insulation or the like.

The gaseous blast may be provided by an attenuation burner which generally comprises a refractory lining encased in a metal housing. While this burner perfomrs admirably for its intended purpose, over prolonged operating periods, glass may be deposited on faces of the refractory material proximate the outlet opening of such a burner. This may be caused by a doubling up of the primary filaments which then contact the faces of the refractory lining of the burner forming an accumulation of glass. Over a period of time other primary filaments contact this accumlation of glass causing a further accumulation.

Typically, an operator of the attenuation burner inconveniently removes the deposited glass by using a suitable mechanical instrument to chip the glass away. Unfortunately, at times such a crude removal system may cause the refractory material forming the faces of the burner to be cracked or otherwise damaged. This damage may cause an undesirable modification of the flow characteristics of the burner resulting in an unscheduled change in fiber quality, increased maintenance down time and uneconomical cost increases for the attenuation process.

BRIEF SUMMARY OF THE INVENTION

The present invention provides a burner for use in the flame attenuation of glass filaments comprising a refractory lining forming a combustion chamber encased in a housing with refractory lining has an outlet opening. A combustible charge is supplied to the combustion chamber by a suitable means and a plate is affixed to the downstream end of the outlet opening on the housing. The plate has a discharge passageway having an area slightly greater than the area of the outlet opening and in alignment with said outlet opening whereby non-attenuated glass deposits may be prevented from contacting the refractory lining of the burner and be readily removable.

BRIEF DESCRIPTION OF THE DRAWINGS

FIG. 1 is a cross sectional elevation view of a conventional attenuation burner apparatus;

FIG. 2 is an elevation view partly in section of a burner appartus embodying the present invention;

FIG. 3 is a pictorial view of the front end of the burner.

DETAILED DESCRIPTION OF THE INVENTION

Like characters are used throughout the following description and the accompanying drawings to designate corresponding parts. Referring first to FIG. 1, there is shown a conventional burner 10 forming a combustion chamber having a refractory lining 12 for producing a hot gaseous blast suitable for use in flame attenuating a multiplicity of continuous primary glass filaments issuing from a melting pot so as to reduce the filaments into fine fibers. The lining 12 is encased by a metal housing 14. However, the front faces 16 and 18 of the lining are not encased by the metal housing 14. The burner has an opening 20 through which the hot gaseous blast passes. The burner is generally mounted as shown in U.S. Pat. Nos. 2,571,025; 3,002,224 3,017,318 and 3,498,772 so that primary filaments are presented adjacent to the outlet opening of the burner to be attenuated into fibers. It is noted that the '224 patent shows a burner having a completely metallic outlet opening.

Conventionally, an operator of the attenuation process periodically utilizes a pointed instrument, e.g., a chisel, in order to eliminate or remove any non-attenuated glass which may be deposited upon the upper face 16 or a lower face 18 adjacent the opening 20 of the burner 10. When chipping away the deposited glass from either the upper face 16 or the lower face 18 of the burner of FIG. 1, an operator may inadvertently damage the refractory material 12 which defines the lining 12. When this happens, the flow properties of the burner 10 will be changed and possibly deleterious attenuation results may be experienced. For example, the fiber quality of the fibers produced by the attenuation burner 10 may be substantially reduced.

Some prior art patents, such as the '224 patent above, show the formation of the outlet opening as a completely metallic structure. This eliminates the desired result of forming the opening from the refractory material 12. In the instant invention, the use of a refractory material to form the outlet opening is retained by utilizing a protector.

The protector 22 illustrated in FIGS. 2 and 3 comprises a plate 24 which has a configuration corresponding to the outside dimensions of the outlet orifice portion of the attentuation burner 10. The plate 24 is provided with an opening or a discharge passageway 26 in alignment with the outlet opening 20. The area of the passageway 26 is slightly greater than the area of the outlet opening 24 of the burner so that the refractory opening 20 is retained. The protector 24 may be attached to the outside of the metal housing 14 by a suitable means such as a plurality of mounting tabs 28 and a plurality of bolts 30 which may be threadingly secured in the refractory materials or components encased within the metal housing 14.

The material of the protector 22 should be selected so as to ensure that it can withstand the hot working temperatures associated with the attenuation burner 10 over extended periods of use. It has been found that a suitable material may be Inconel. Another material is stainless steel.

The provision of a protector 22 reduces the possibility that damage to the refractory 12 proximate the outlet opening 20 of the burner 10 will occur when an operator of the burner 10 performs maintenance upon the burner. This maintenance is, of course, related to the removal of any glass deposits from the areas proximate the outlet opening 20. Instead of chipping away the glass from the faces 16 and 18, an operator of an attenuation burner modified in accordance with the principles of the present invention would be chipping away glass from the protector 22. Clearly, the refractory 12 forming the faces 16 and 18 would not be contacted and therefore not damaged. As a result, since the refractory 12 proximate the outlet opening 20 is not damaged, the flow characteristics through the opening 20 will not be undesirably modified. Accordingly, the attenuation burner 10 modified according to the present invention will have a longer service life, reduced down time caused by maintenance of the refractory of the burner and will prevent or substantially reduce the degradation of the efficiency of the attenuation burner.

It is to be understood that all the details in the foregoing description of the invention need not be strictly adhered to and that various changes and modifications may suggest themselves to one skilled in the art, all falling within the scope of the invention as defined by the sub-joined claims. For example, the present invention is suitable for use in any burner whose outlet orifice comprises a material which may be damaged by cleaning as described above.

What is claimed and desired to be secured by Letters Patents of the United States is:

1. A burner for use in the flame attenuation of filaments, comprising:

a combustion chamber, said combustion chamber including a metal casing and a refractory lining, said casing at least partially surrounding the refractory lining and said lining having an inlet opening and an outlet opening, said outlet opening being formed in an inclined front surface of said refractory lining and defining upper and lower front faces, said combustion chamber having a pair of substantially parallel surfaces, a first intermediate surface positioned between and inclined relative to both one of said substantially parallel surfaces and said upper front face, a second intermediate surface positioned between and inclined relative to both the other of said substantially parallel surfaces and said lower front face, said metal casing enclosing said pair of substantially parallel surfaces and said first and second intermediate surfaces but leaving said inclined front surface exposed;

means for supplying a fuel/air mixture to said chamber;

means for igniting said mixture; and protective means attached to at least one of said intermediate surfaces which overlaps the metal casing enclosing said surface, and partially covers said inclined front surface to protect it from engagement by improperly attenuated filaments.

2. The burner of claim 1, wherein the protective means is attached to both intermediate surfaces and covers substantially all of the upper and lower front faces.

3. The burner of claim 2, wherein the protective means comprises a plate member with an opening which is slightly larger than the outlet opening.

4. The burner of claim 3, wherein the plate member is constructed of heat-resistant metal.

5. The burner of claim 4, wherein said plate is constructed of Inconel.

* * * * *